Oct. 13, 1953  B. S. MINOR ET AL  2,655,633
APPARATUS FOR MEASURING PIPE IN OR OUT OF HOLES
Filed May 7, 1951  2 Sheets-Sheet 1
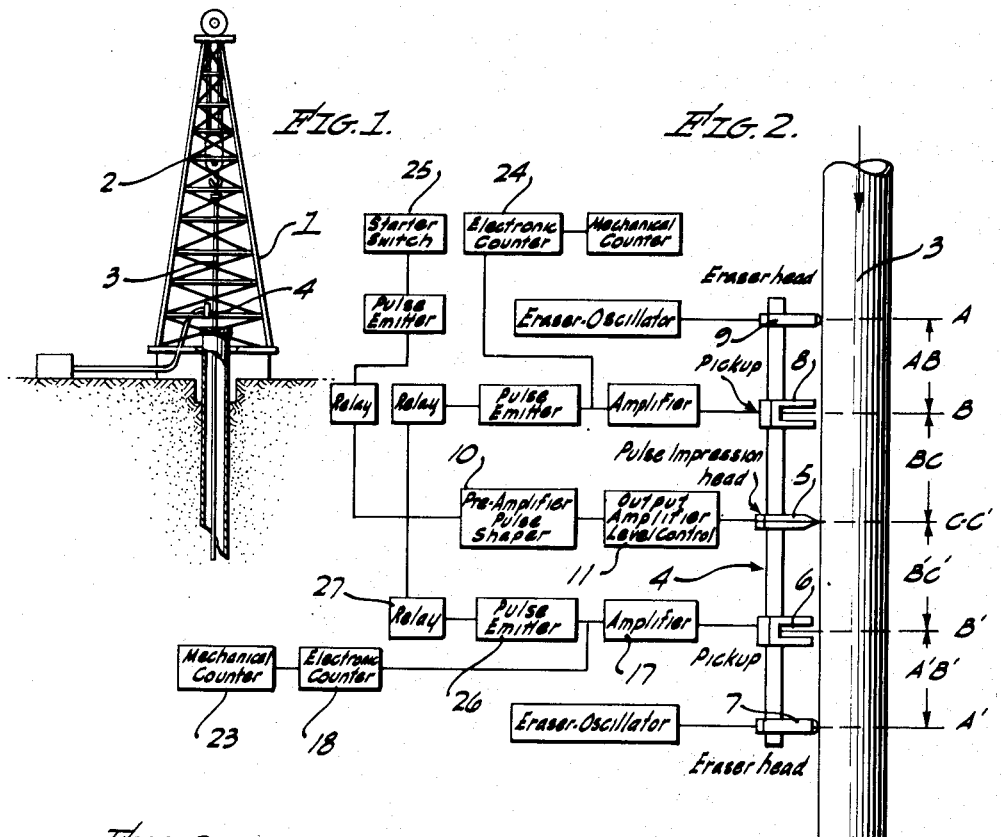
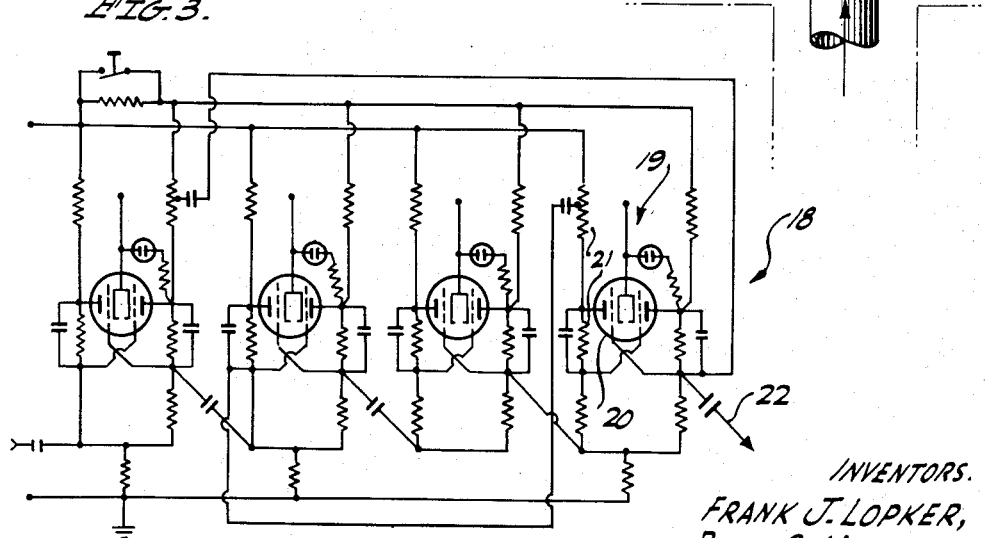
INVENTORS.
FRANK J. LOPKER,
BURT S. MINOR,
BY
ATTORNEY.

Oct. 13, 1953     B. S. MINOR ET AL     2,655,633
APPARATUS FOR MEASURING PIPE IN OR OUT OF HOLES
Filed May 7, 1951     2 Sheets-Sheet 2

INVENTORS,
FRANK J. LOPKER,
BY   BURT S. MINOR,
ATTORNEY.

Patented Oct. 13, 1953

2,655,633

UNITED STATES PATENT OFFICE 2,655,633
APPARATUS FOR MEASURING PIPE
IN OR OUT OF HOLES

Burt S. Minor, Whittier, and Frank J. Lopker, Los Angeles, Calif., assignors to Regan Forge & Engineering Co., San Pedro, Calif., a corporation of California Application May 7, 1951, Serial No. 224,984

4 Claims. (Cl. 324—34)

This invention relates to a device for measuring the length of tubing, casing, drill pipe, etc., as it is being lowered into or raised out of an oil well. It can also be used for many other purposes, for example, the measuring of lengths of wire, wire rope, strip stock, rails, etc.

The primary object of our invention is to provide means of this type, which is simple and efficient in operation, and which automatically registers, at all times, the amount or length of pipe which has been lowered into or raised out of a well.

In ordinary practice, when pipe is being moved into an oil well, it is also moved in an opposite direction or upwardly a certain amount due to the need to release the slips which engage the pipe as it is being threaded together and for other purposes, therefore, it is necessary to record or register the net movement of the pipe into the well in order that an accurate measurement may be obtained.

Another object of our invention, therefore, is to provide a means of recording or registering the movement of pipe both into and out of the well, the algebraic sum of these measurements being the net amount of pipe which is lowered into the well.

A feature of our invention is to measure the length of pipe as it is moved into or out of a well by the use of a device similar to a wire recorder which magnetically marks the material which is to be measured; these markings will be placed a predetermined distance apart; as the markings pass a pick-up device, they will be counted through an appropriate type of counting device, and this count will be translated into units of length.

Still another feature of our invention is to provide a recorder unit adjacent to the material which is to be measured, this recorder unit impressing a "pip" magnetically on the material and then picking up this "pip" in a receiver accurately spaced from the recorder, then counting these "pips" or signals as they are received by the receiver and then erasing the "pip" or signal after it passes the receiver.

Other objects, advantages and features of invention may appear from the accompanying drawing, the subjoined detailed description and the appended claims.

In the drawing—

Figure 1 is a diagrammatic view of an oil well, showing the position of our electronic measuring device.

Figure 2 is a diagrammatic layout of our electronic measuring method.

Figure 3 is a wiring diagram of one type of electronic counter, which might be used in connection with our measuring method.

Figure 4:
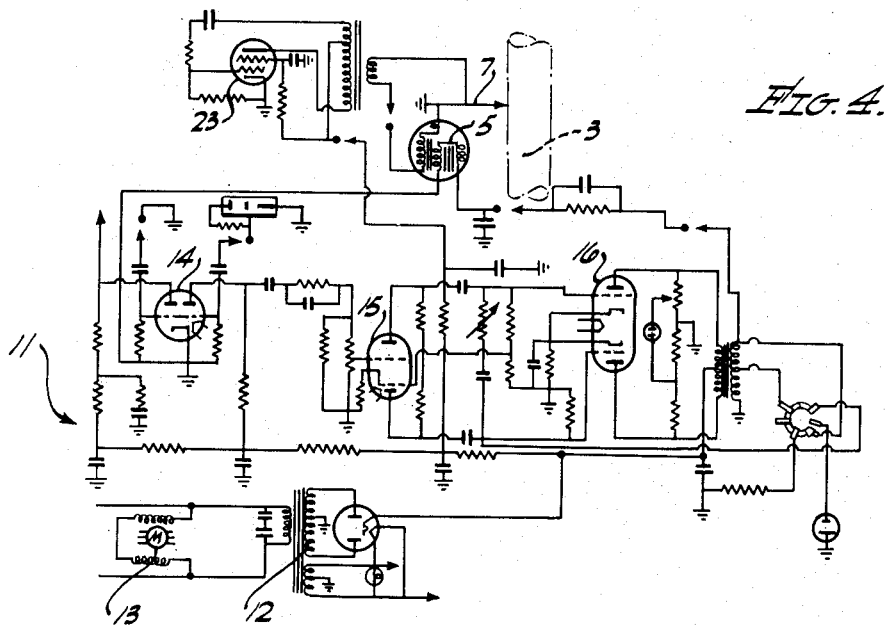
Figure 4 is a wiring diagram of one type of recording circuit which is used in connection with our electronic measuring method.

Referring more particularly to the drawing, the numeral 1 indicates the usual oil well derrick in which the travelling block 2 is mounted and on which the pipe 3 is suspended to either raise or lower this pipe in the oil well.

Referring first to Figure 2, we provide an electronic head or unit 4, which is positioned adjacent to the pipe 3, as shown, and includes a recording head 5, which magnetically places a "pip" on to the pipe as the pipe is lowered past this head. The head 5 is spaced slightly from the pipe so that collars, etc. can pass.

Positioned below the head 5, we provide a pick-up head 6, which is spaced below the head 5, by the distance B'—C'. The distance B'—C' is accurate and a fixed amount, as will be subsequently described. An erasing head 7 is positioned below the pick-up head 6 and this erasing head is spaced below the head 6 by a distance A'—B'. A second pick-up head 8 may be provided above the recording head 5 and is spaced a distance B—C above the head 5. A second erasing head 9 may also be provided above the pick-up head and is spaced a distance A—B above the pick-up head. It is necessary that the distance A—B and A'—B' be less than the distance B—C and B'—C'. Also, the distance B—C equals the distance B'—C'.

It is well known that a number of circuits can be used to magnetically impress a signal on to the pipe 3 through the head 5. Such an electric unit may include a pulse shaper 10 which transmits the "pip" or other signal. This signal then goes into the output amplifier level control 11, which then places the signal into the head 5, and thence on to the pipe 3 in the usual and well known manner of wire recorders. The particular amplifying circuit may be of the type shown in Figure 4, but this is only one example of many types of electric circuits.

The 110 volt incoming current passes through the power transformer 12, and thence into the electronic circuit which amplifies the signal which is introduced through the microphone or other sound pick-up tubes 13, and thence through the triodes 14, 15 and 16. The amplified signal is then passed through the head 5 and magnetically impressed on the pipe 3. The various resistances, condensers, etc., in the circuit shown in Figure 4 may be varied to suit the particular requirements of the unit.

Figure 5:
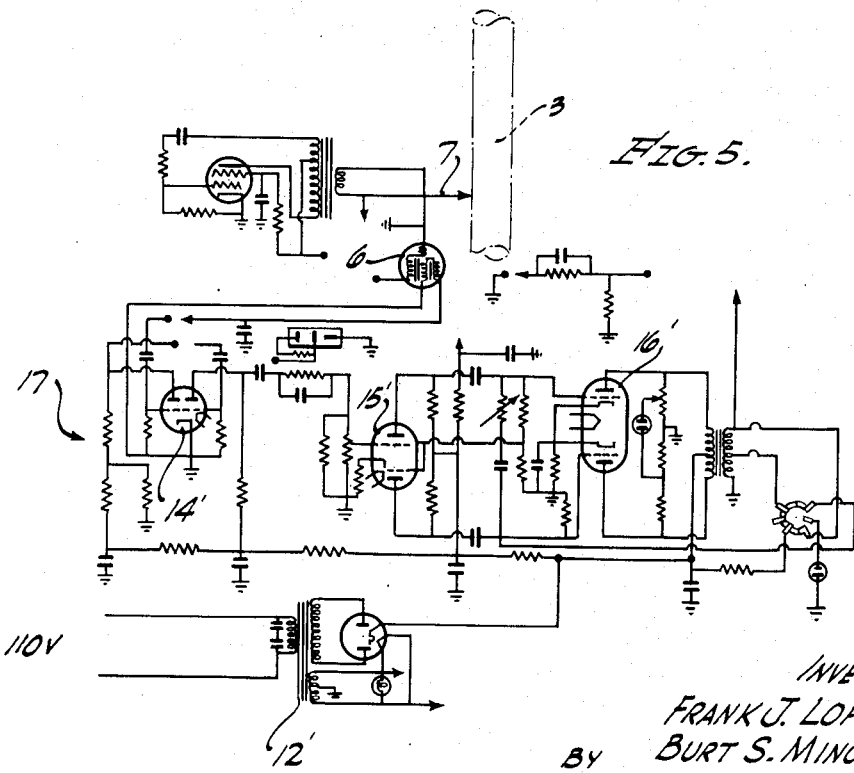
Figure 5 is a wiring diagram of one type of receiving or listening circuit which is used in connection with our electronic measuring method.

In Figure 5 the electronic amplifier 17 is shown, and this amplifier is or may be identical to the amplifier shown in Figure 4, the tubes 14', 15' and 16' being identical to the tubes 14, 15, and 16, previously described. Also, the power transformer 12' may be of the same type as shown at 12. The "pip" or other signal is received in the head 6 and is amplified through the triode tubes and picked up by the counter 18, which may be either of the mechanical or electronic type, as desired. If it is of the electronic type, a typical wiring diagram is shown in Figure 3.

Electronic counters have been known and used for many years and the electronic counter 18 is merely one example which can be used. As here shown, the counter consists of four or more identical circuits 19, the circuits being inter-connected so that a certain number of pulses from one circuit will cause the operation of the succeeding circuit, etc., throughout the counter. Specifically, as here shown, each stage 19 employs an ordinary dual triode vacuum tube 20 arranged in a well known trigger circuit. The basic functioning of all four or more stages is alike and is dependent upon shifting of operating potentials back and forth between the various stages. A fixed potential is applied to the cathode of the tube at all times and grid plate potentials are obtained from the resistance network 21.

The output of the counter is indicated at 22 and if desired a mechanical counter 23 can be connected with the electronic counter to carry a continuous total of the number of pulses which pass the receiver head 6. After the magnetic impressions, i. e., the "pip," passes the receiver head 6 it is erased by the erasing head 7, and this erasing head may be operated by the electronic circuit shown in Figure 4 and consists of a tube 23, which operates only as an oscillator to generate the erase voltage which is impressed on the head 7. The tube 23 may be of the 6V6 type or similar tube.

It is evident that the pipe 3 will move both upwardly and downwardly while it is being inserted in the well and, consequently, the upward movement of the pipe must be ascertained and subtracted from the total movement of the pipe so that the proper length of the pipe may be obtained. If the pipe 3 moves upwardly, the "pip" or magnetic mark is received on the head 8 and is counted by the electronic counter 24 identical to the counter 18. At the completion of the run, the total numbers recorded on the counter 18 which will give the total length of pipe 3. The top erasing head 9 is also provided so that on upward movement of the pipe the "pip" or magnetic mark will be erased as it passes the head 9.

In operation, the starter switch 25 is closed manually and a pulse is transmitted to the amplifier 10 and output amplifier 11, and thence to the output head 5, thus placing a "pip" or electronic mark on the pipe 3 as this pipe starts to move downwardly. Now, as this pulse passes the receiver or pick-up head 6, the signal is amplified at 17 and then passes into the electronic counter 18 where the successive signals are counted. The head 6 is a definite distance below the head 5, i. e., B'C' and this distance is fixed and is known. As the pipe 3 continues to move downwardly, the magnetic signal on the pipe is erased by the head 7. As the "pip" passes the head 6 and is amplified at 17, as previously described, the pulse also passes through the pulse emitter 26 and thence through the relay 27, which causes another pulse to be sent back through 10 and 11, and thence through the head 5 and on to the pipe 3. This pulse is repetitive as long as the pipe 3 continues to move either downwardly or upwardly. Since the distance B—C and B'—C' are fixed and known, therefore, the number of "pips" counted by the counters 18 and 24, can be translated into units of length. The distance A—B and A'—B' are less than B—C and B'—C', so that the magnetic signal will be wiped off of the pipe as soon as it passes the heads 6 or 8. The total length of the pipe 3 will be calculated by the algebraic sum of the counters 18 and 24.

As the "pip" passes the head 8 it will be picked up and immediately counted by the counters 18 and 23, and at the same time the pulse emitter 26 is actuated, which sends another pulse through the pulse shaper 10 and output 11, and thence to the head 5, thus placing the next "pip" on the pipe which is again counted as it passes the head 6, as previously described. This continues as long as the pipe 3 continues to move. It will thus be evident that a pulse is automatically initiated each time that a "pip" passes the head 6 and is counted. The "pips" are all erased by the eraser head 7 so that there is no danger that they will be counted more than once.

The gate circuit 27 acts as an electric or electronic valve causing the signals to move only in one direction. The gate permits energy to pass from the pulse emitter 26 to the pulse shaper 10, but not in a reverse direction.

Having described our invention, we claim:

1. Apparatus for measuring moving pipe and the like including an electronic recorder to place a magnetic impression on said pipe as it passes, means to impress a pulse signal on said recorder, a pair of pick-up means located at predetermined distances on opposite sides of said recorder, individual means connecting each of said pick-up means with said recorder and pulse signal means for controlling said recorder from said pick-up means to cause placing of magnetic impressions, means to count the impressions picked up by each of said pick-up means and a pair of erasing means on opposite sides of said recorder and beyond said pick-up means to erase magnetic impressions which have actuated said pick-up means and said recorder.

2. Apparatus as in claim 1 wherein the spacing between each erasing means and the adjacent pick-up means is less than the spacing between such pick-up means and the recorder and wherein said predetermined distances are equal distances.

3. Apparatus for measuring moving pipe and the like including an electronic recorder to place a magnetic impression on said pipe as it passes, means to impress a pulse signal on said recorder, a pair of pick-up means located at predetermined distances on opposite sides of said recorder, individual means connecting each of said pick-up means with said recorder and pulse signal means for controlling said recorder from said pick-up means to cause placing of magnetic impressions and a pair of erasing means on opoposite sides of said recorder and beyond said pick-up means to erase magnetic impressions which have actuated said pick-up means and said recorder.

4. Apparatus for measuring moving pipe and the like including an electronic recorder to place a magnetic impression on said pipe as it passes, means to impress a pulse signal on said recorder, a first pick-up means beyond said recorder on one side thereof at a predetermined spacing, means connecting said first pick-up means with said recorder and pulse signal means for controlling said recorder from said first pick-up means to cause placing of a magnetic impression, means to count the impressions picked up by said first pick-up means, a first erasing means beyond said first pick-up means and on the opposite side thereof from said recorder to erase a magnetic impression after it has actuated said first pick-up means and said recorder, a second pick-up means on the other side of said recorder at a predetermined spacing, means connecting said second pick-up means with said recorder and pulse signal means for controlling said recorder from said second pick-up means to cause placing of a magnetic impression, means to count the impressions picked up by said second pick-up means and a second erasing means beyond said second pick-up means and on the opposite side thereof from said recorder to erase a magnetic impression after it has actuated said second pick-up means and said recorder.

BURT S. MINOR.
FRANK J. LOPKER.

References Cited in the file of this patent

UNITED STATES PATENTS

| Number | Name | Date |
| --- | --- | --- |
| 2,332,797 | Hume | Oct. 23, 1943 |
| 2,466,251 | Martin | Apr. 5, 1949 |
| 2,488,277 | Falk et al. | Nov. 15, 1949 |
| 2,581,209 | Shepard et al. | Jan. 1, 1952 |
| 2,603,688 | Cole et al. | July 15, 1952 |